(12) United States Patent
Kaur et al.

(10) Patent No.: US 7,826,349 B2
(45) Date of Patent: Nov. 2, 2010

(54) CONNECTION MANAGEMENT MECHANISM

(75) Inventors: Sumeet Kaur, Chandler, AZ (US); David A. Draggon, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 11/444,756

(22) Filed: May 30, 2006

(65) Prior Publication Data

US 2008/0005314 A1 Jan. 3, 2008

(51) Int. Cl.
*G01R 31/08* (2006.01)
*G06F 11/00* (2006.01)

(52) U.S. Cl. .................. 370/229; 370/230; 370/232; 709/224; 709/225; 709/226; 709/235; 710/29; 710/36; 710/38; 710/316

(58) Field of Classification Search ............ 710/22, 710/36; 709/224, 223; 370/229, 230
See application file for complete search history.

(56) References Cited

U.S. PATENT DOCUMENTS

| | | | |
|---|---|---|---|
| 4,984,237 A * | 1/1991 | Franaszek ............ | 370/388 |
| 5,521,905 A * | 5/1996 | Oda et al. ............ | 370/232 |
| 5,621,723 A * | 4/1997 | Walton et al. ........ | 370/335 |
| 6,070,191 A * | 5/2000 | Narendran et al. ..... | 709/226 |
| 6,252,910 B1 | 6/2001 | West et al. ........... | 375/261 |
| 6,498,782 B1 * | 12/2002 | Branstad et al. ...... | 370/231 |
| 6,560,204 B1 * | 5/2003 | Rayes ................ | 370/253 |
| 6,574,667 B1 * | 6/2003 | Blumenau et al. ..... | 709/229 |
| 6,788,646 B1 * | 9/2004 | Fodor et al. ......... | 370/230 |
| 6,820,172 B2 * | 11/2004 | Nielsen et al. ........ | 711/114 |
| 6,973,529 B2 * | 12/2005 | Casper et al. ........ | 710/316 |
| 7,307,961 B2 * | 12/2007 | Radpour .............. | 370/252 |
| 7,483,998 B2 * | 1/2009 | Rabinovitch .......... | 709/238 |
| 2001/0029543 A1 * | 10/2001 | Iwata et al. .......... | 709/233 |
| 2002/0188750 A1 * | 12/2002 | Li ................... | 709/235 |
| 2003/0189901 A1 * | 10/2003 | Ozugur et al. ........ | 370/230 |
| 2003/0200477 A1 * | 10/2003 | Ayres ................ | 714/2 |
| 2004/0062205 A1 * | 4/2004 | Friskney et al. ...... | 370/252 |
| 2005/0195739 A1 * | 9/2005 | Grover et al. ........ | 370/225 |
| 2005/0237936 A1 * | 10/2005 | Verma et al. ......... | 370/252 |
| 2006/0212188 A1 * | 9/2006 | Kickbusch et al. ..... | 701/19 |
| 2006/0230218 A1 * | 10/2006 | Warren et al. ........ | 710/315 |
| 2007/0002804 A1 * | 1/2007 | Xiong et al. ......... | 370/335 |
| 2007/0054626 A1 * | 3/2007 | Li et al. ............ | 455/69 |
| 2007/0147522 A1 * | 6/2007 | Seto et al. .......... | 375/260 |

OTHER PUBLICATIONS

'Routing and Wavelength Assignment in Wavelength Division Multiplexing Networks' by Pal et al., IWDC 2004.*
'An Effective BECN/CRN Typed Deflection Routing for QoS Guaranteed Optical Burst Switching' by Tanida et al., Global Telecommunications Conference 2003.*
'A New Design of Node Configuration Using Single Stage of Small Switches for All-Optical Networks' by Hung et al. from the 2001 International Symposium on Performance Evaluation of Computer and Telecommunication Systems.*
'Wavelength Assignment for Dynamic Traffic in Multi-fiber WDM Networks' by Zhang et al., 7th ICCCN (International Conference on Computer Communications and Networks), 1998.*

* cited by examiner

*Primary Examiner*—Henry W Tsai
*Assistant Examiner*—Steven G Snyder
(74) *Attorney, Agent, or Firm*—Christopher K. Gagne

(57) ABSTRACT

A host device is disclosed. The host device includes a receive frame and primitive sequence processor and a connection manager to open a connection with a target device based on a probability of a blocked pathway.

26 Claims, 5 Drawing Sheets

CONNECTION MANAGEMENT MECHANISM

FIELD

This disclosure relates to computer systems; more particularly, this disclosure relates to computer system interaction with hard disk drives.

BACKGROUND

Serial attached storage protocols, such as Fibre Channel, serial Advanced Technology Attachment (ATA) (SATA) and serial attached Small Computer System Interface (SCSI) (SAS) are becoming more prevalent for connecting storage devices to a computer system. In computer systems implementing such serial storage devices, one storage device in the system may communicate with others. For example, a device requesting data (referred to as the initiator device) may receive data from a target device.

Typically, communications between the devices may occur after an identification sequence and the establishing of connections. Connection establishments, input/output (I/O) transfers and terminations are typically performed by a connection manager within the initiator device.

In SAS, each established connection is regularly closed to allow fairness in resource allocation. The simplest implementation of connection management in a SAS controller manifestation would be to create a new connection for each frame to be transmitted. However, such a scheme ignores system state parameters. Moreover, this connection management scheme is not optimal in multiple initiator scenarios even though it conforms to SAS. For instance, there is constant waste in resources in terms of connection open-close overheads, especially when a time slot is granted but the connection fails because the pathway is blocked downstream.

BRIEF DESCRIPTION OF THE DRAWINGS

An embodiment of the invention is illustrated by way of example and not limitation in the figures of the accompanying drawings, in which like references indicate similar elements, and in which.

DETAILED DESCRIPTION

Figure 1:
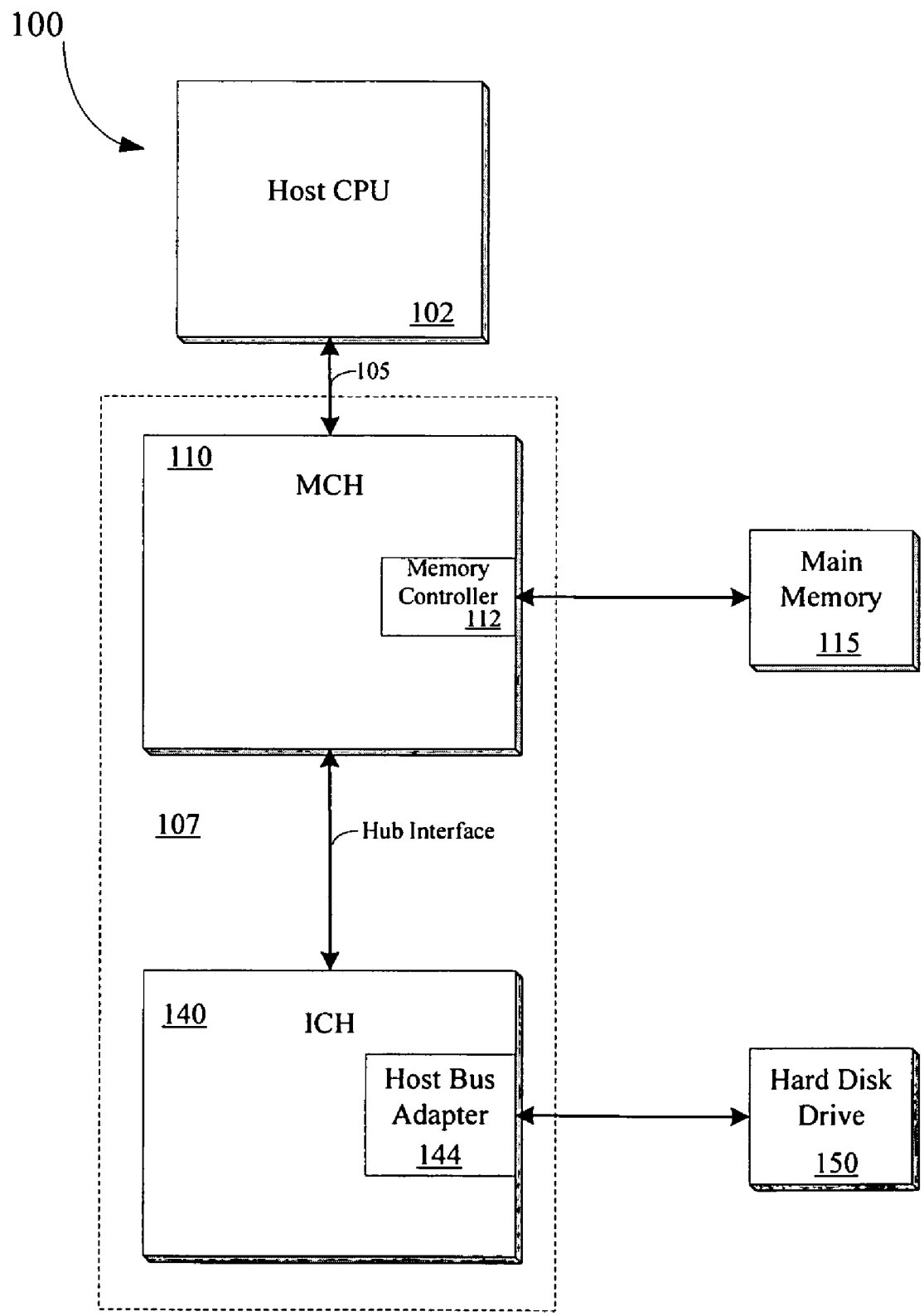
FIG. 1 is a block diagram of one embodiment of a computer system.

A connection management mechanism is described. In the following detailed description of embodiments of the present invention numerous specific details are set forth in order to provide a thorough understanding. However, it will be apparent to one skilled in the art that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs).

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102.

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more storage devices 150. In one embodiment, storage device 150 is a serial attached SCSI (SAS) drive. However in other embodiments, storage device 150 may use other serial protocols.

As discussed above, communication may occur between devices upon establishing a connection if between an initiator device such as HBA 144 (device A), and an end device such as storage device 150 (device B). Further, HBA 144 may be coupled to multiple storage devices via different ports. However in other embodiments, HBA 144 may be coupled to an expander device, which is coupled to other storage devices.

Figure 2:
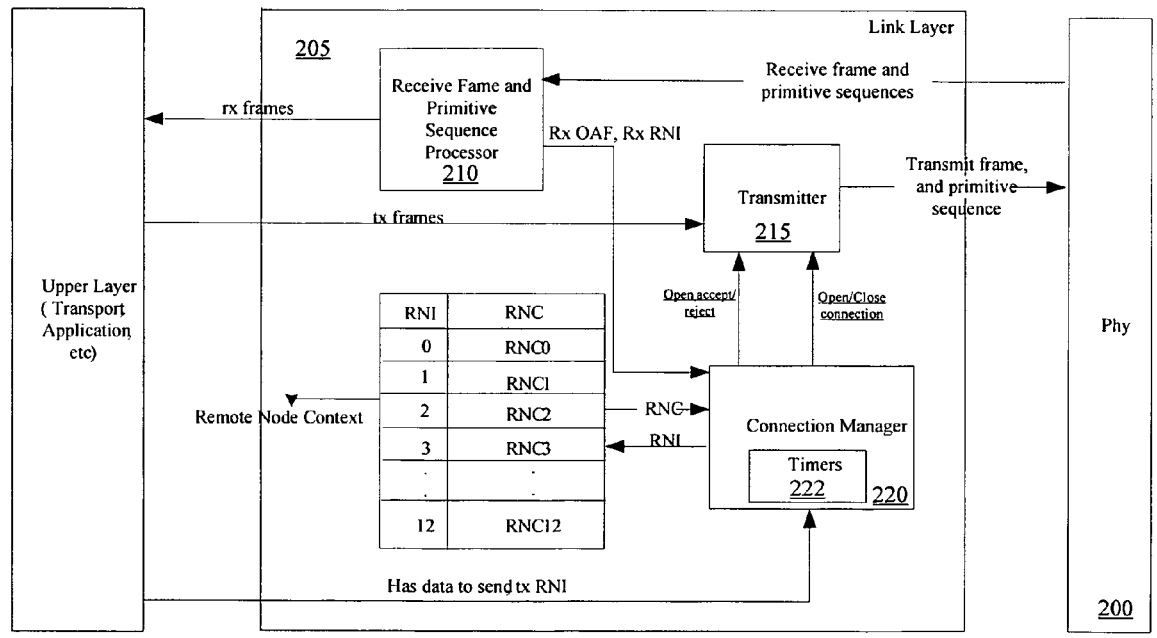
FIG. 2 illustrates one embodiment of a host bus adapter.

FIG. 2 illustrates one embodiment of HBA 144. HBA 144 includes a Phy 200 and a link layer 205. Phy 200 includes transmitter and receiver circuitry that communicates with other devices via cables and connectors. Further, Phy 200 performs encoding schemes and the phy reset sequence. Link layer 205 controls link level communication for each SAS link. Such communication includes an identification sequence, connection management, and frame transmission requested by the port layer (not shown), frame reception and primitive sequence processing/transmission.

Link layer 205 includes receive frame and primitive sequence processor 210, transmitter 215, and connection manager 220. According to one embodiment, link layer 205 supports four physical links. Thus, link layer 205 includes four transmitters and four receivers in such an embodiment, although only one of each is shown.

Receive frame and primitive sequence processor 210 detects an open address frame and parses out the information in the open address frame. Transmitter 215 is included to transmit frames and primitive sequences. The Remote Node Context (RNC) look up table is a remote node context information table that is indexed by Remote Node Index (RNI).

Connection manager 220 controls the connection between device A and device B based upon the RNC contents received from the RNC lookup table. Connection manager 220 handles the establishing and terminating of a connection. Connection manager 220 facilitates connection management in an on-demand basis so that a connection management scheme meets significant objectives. Such objectives include fair allocation of resources, efficient utilization of resources without creating deadlock situations, and reduction in domain wide connection management overhead.

As discussed above, each connection is regularly closed to allow fairness in resource allocation. Conventional connection management in a SAS controller creates a new connection for each frame to be transmitted. Such a uniform slot time division multiple algorithm (TDMA) scheme conforms to the SAS specification, but it is not optimal given the non uniform burst nature of SAS traffic.

Particularly, in a simple TDMA connection scheme, the connection manager initiates a new connection by transmitting Open primitives for each frame to be transmitted. Once a 1 KB payload frame has been transmitted, the connection is closed by exchange of appropriate close primitives. Thus, for each 1 KB of payload that is transmitted, an overhead exists in terms of exchange of connection primitives.

This becomes significant in scenarios where there is only one initiator trying to communicate with the target and no other competing initiator is trying to reach the same target. The fairness scheme in this implementation is overkill in such a situation as this scenario should be ideally handled as a direct attached, without the overhead of connection management.

At the same time, the connection management algorithm is to be able to handle connection collisions without depriving any initiator. By allocating uniform connection times for all possible initiators, the fairness objective is met. But given the bursty, non-uniform nature of SAS traffic, it is possible that a given initiator does not need the connection and hence its time slot is wasted, while other initiators may be kept waiting.

According to one embodiment, the connection management scheme implemented by connection manager 220 allocates a connection based upon a "Probability of Blocked Pathway" (PBP). For instance, in a multi-tier SAS topology, the probability of establishing a pathway is inversely proportional to the number of devices in the pathway.

Subsequently, the probability of blocking the establishment of a pathway is directly proportional to a number of links (e.g., devices) in the pathway. For a pathway with several links, a single device waiting for connection may cause other devices in the pathway waiting on its connection allocation. Therefore, by allocating a connection to an initiator with the highest PBP, the probability of keeping other devices with competing access requests gated on that connection established are reduced.

In a further embodiment, the connection management scheme implemented by connection manager 220 includes additional characteristics. First, if there is no competing connection request and more data is pending transmission for the existing connection, the connection should be kept open until all data has been transmitted.

In addition, in a multiple initiator topology, if there are competing connection requests and more data is pending transmission for the existing connection, the decision depends on probability of blocked pathway for each initiator device. Further, in case aforementioned parameters fail to resolve a connection collision, the connection remains open until a connection timer 220 within connection manager 220 expires. In various embodiments, timer 220 may be implemented by using an actual time elapsed measure or an implied equivalent that simply counts the number of frames actually transmitted.

Figure 3:
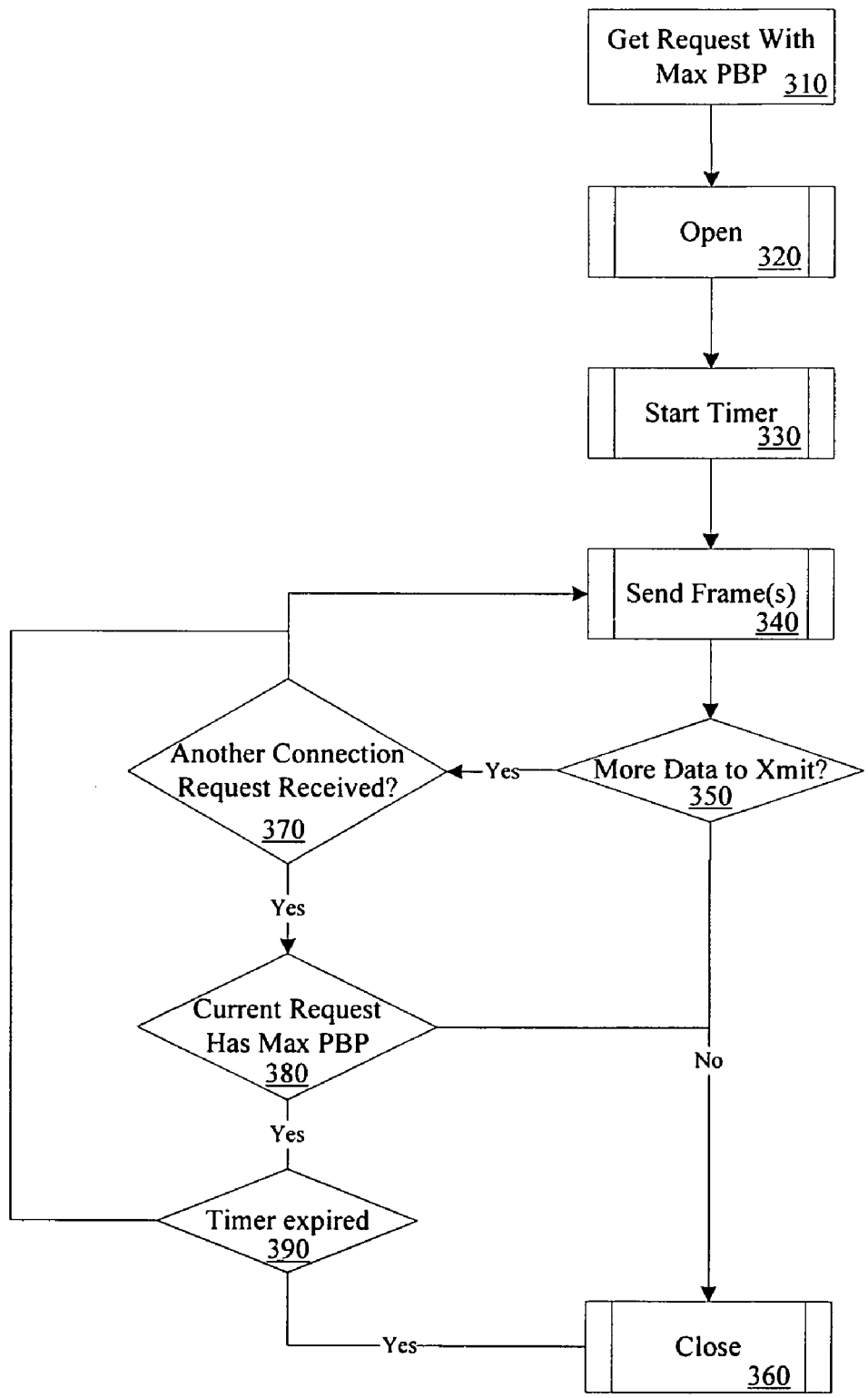
FIG. 3 is a flow diagram of one embodiment for operation for a connection manager.

FIG. 3 is a flow diagram for one embodiment of operation for a connection manager 220 employing the above-described connection management scheme. At processing block 310, a connection request with a maximum PBP is received at connection manager 220 to open a connection (e.g., between device A and device B). When the resources become available, connection manager 220 opens a new connection for the frame that is first in a Frames Pending Transmission Queue, processing block 320. At processing block 330, connection timer 222 is initiated.

At processing block 340, data frames are transmitted from the device. At decision block 350, it is determined at connection manager 220 whether additional data is available to be transmitted. According to one embodiment, after a 1 KB payload has been transmitted, the decision to keep the existing connection open will depend on whether more data is available for transmission. If no more data is available for transmission the connection is closed, processing block 360.

If additional data is available to be transmitted, it is determined at connection manager 220 whether there are competing requests received from other initiator devices to transfer data to the same target, decision block 370. If there are no competing connection requests, control is returned to processing block 340 where data frames are transmitted from the device.

However, if there are competing connection requests, it is determined whether the existing request continues to have the highest PBP, decision block 380. In one embodiment, the PBP may be computed after each discovery of a device in the by the host device and stored in a global database (not shown) that includes the remote device handler.

If the existing request does not have the highest PBP the connection is closed at processing block 360. If the existing request continues, however, to have the highest PBP it is determined whether connection timer 222 has expired. If timer 222 has expired, the connection is closed, at processing block 360. Otherwise, control is returned to processing block 340 where data frames are transmitted from the device.

Figure 4:
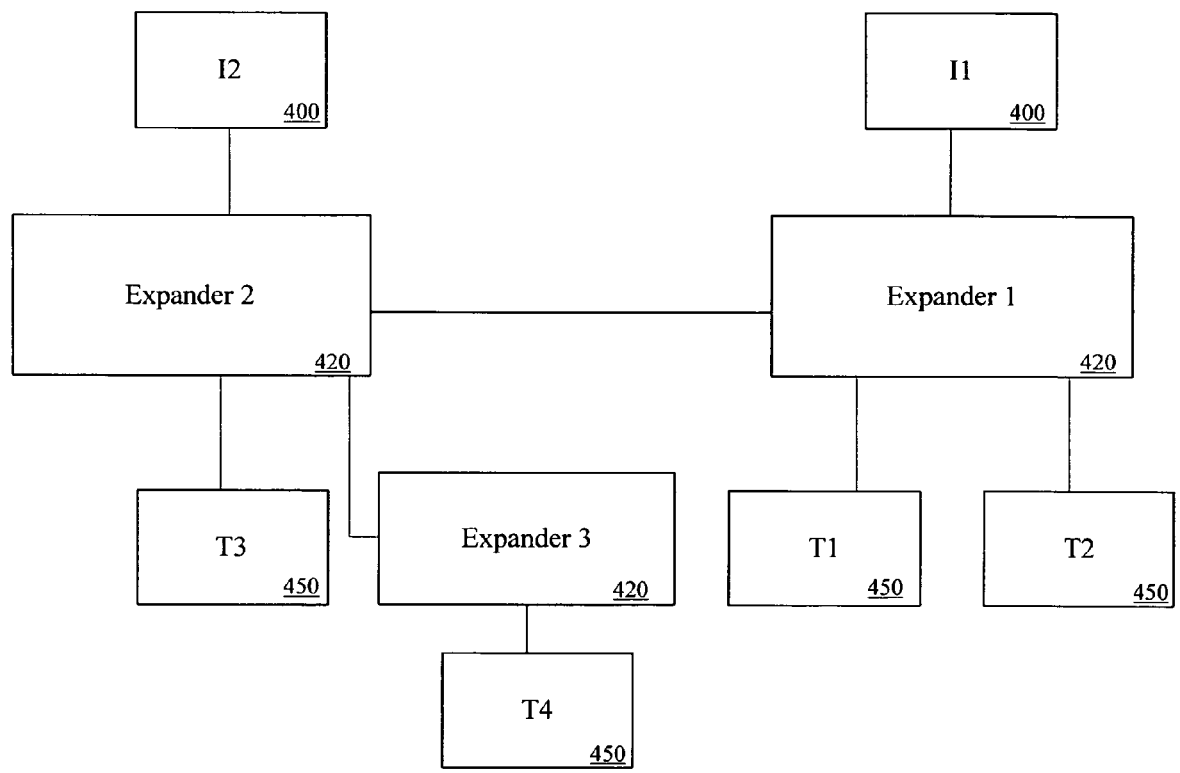
FIG. 4 illustrates one embodiment of a SAS architecture.

The following example illustrates an implementation of the PBP connection management scheme. FIG. 4 illustrates one embodiment of a multiple initiator SAS architecture in which the connection scheme may be implemented. Included are initiator devices 400 (I1 and I2), expanders 420 (expander 1, 2 and 3) and target devices 450 (T1, T2, T3 and T4).

For simplicity of mathematical computation the following assumptions are made: the initial system state is idle; all links in the domain have the same speed; the total time for connection establishment and close (e.g., open-close primitive) is tc; the total time for transmitting a frame is tf; and the connection timer limit is 5*(tf+tc).

In addition, the following data traffic distribution is considered: 1) the host for Initiator I1 transmits a request R1 to transmit eight frames of data to target T1; and 2) at the point of time where four frames have been transmitted, the host submits another request R2 for I1 to send three frames to T3. It is followed by a request R3 by the host to Initiator I1 to target T4 for transmission of three frames.

For a conventional connection management scheme where (e.g., a simple open-transmit a frame-close connection scheme), the flow of data is as follows. First, R1 is serviced and Initiator I1 establishes a connection with T1 via expander 1, transmits a frame and closes a connection eight times. R2 is kept waiting for 4*(tf+tc) seconds before I1 is able to establish the connection to T3, transmit a frame and close a connection. Similarly, R3 is kept waiting for a total of (7*(tf+tc)) seconds before I can establish the connection to T4, transmit a frame and close a connection.

However, with the connection management scheme described above with respect to FIG. 3, the flow of data is as follows. R1 is serviced and I1 opens a connection to T1, transmits five frames before the connection timer expires. Since the PBP for R3 is greater than PBP for R1 and R2, the new connection is opened for T4, I1 transmits its three frames and then closes the connection once it is has completed. The new connection is now given as per R2, and I1 transmits three frames to T3 and then closes the connection. Finally the connection is opened for R1, and after transmitting three frames to T4, I1 closes the connection.

Table 1 shows the statistics for both the conventional scheme and the PBP connection management scheme for the above example.

TABLE 1

|  | Conventional CM Scheme | PBP CM Scheme |
| --- | --- | --- |
| Number of open-close exchanges | 14 | 4 |
| Wait time for R1 in sec. | 0 | (6 * (t$_f$ + t$_c$)) |
| Wait time for R2 in sec. | 4 * (t$_f$ + t$_c$) | 3 * (t$_f$ + t$_c$) |
| Wait time for R3 in sec. | 7 * (t$_f$ + t$_c$) | 1 * (t$_f$ + t$_c$) |

Note that the deadlock scenarios may be reflected by multiple requests to T3 and T4 from initiator 12. While the conventional approach simply ignores the probability of deadlock, the PBP connection management scheme inherently works to avoid such scenarios by prioritizing on basis of PBP. Moreover the PBP connection management scheme reduces the connection open-close overhead without sacrificing fair allocation of resources.

Thus, the above-described PBP connection management scheme provides a consistent connection management scheme for link layer communication with both direct and indirect attached targets, an arbitration scheme that optimizes the connection open-close overhead as per the system state, and inherent deadlock avoidance mechanism at expander/controller level.

According to one embodiment, the connection management scheme implemented by connection manager 220 is a variable TDMA scheme that incorporates a fair arbitration algorithm, as well as provides an ability to estimate a tradeoff between keeping an existing connection open and opening a new connection. In this embodiment, connection timer 222 is again implemented by using an actual time elapsed measure or an implied equivalent that simply counts the number of frames actually transmitted.

In one embodiment, timer 222 duration may be a function of the number of initiator devices that may need the connection (e.g., time slot (T)α(1/Number unique connection requests)). Therefore, for a direct attached device, it may be possible to completely bypass timer 222. Also in other embodiments, a more desirable overhead can be achieved by varying the number of Bytes (N) transmitted per connection (e.g., N=6 yields ~1% overhead).

Other characteristics of the variable TDMA scheme are that for each new connection that is opened, connection timer 222 is started. In addition, if there is no data to transmit and there are competing connection requests, the connection is terminated even if the elapsed time for the connection is less than the time slot T and resource is made available to other initiator devices, if any. Moreover, if there remain additional payloads to transmit and there are competing connection requests, the connection is kept open until the connection time expires.

Figure 5:
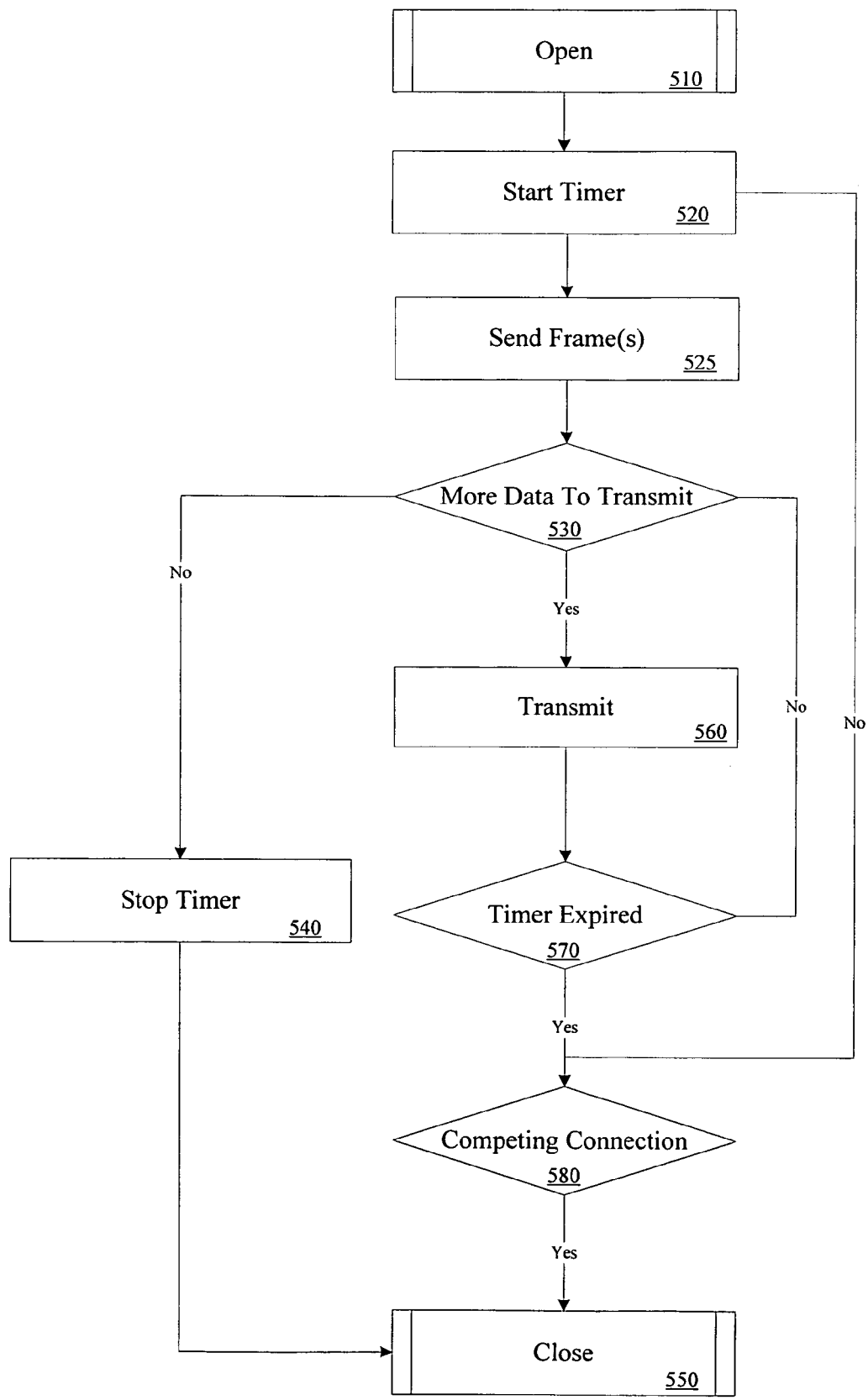
FIG. 5 is a flow diagram of another embodiment for operation for a connection manager.

FIG. 5 is a flow diagram for one embodiment of operation for a connection manager 220 employing the variable TDMA connection management scheme. At processing block 510, a new connection is opened for the frame that is first in the Frames Pending Transmission Queue when the resources become available. At processing block 520, connection timer 222 is initiated.

At processing block 525, data frames are transmitted from the device. At decision block 530, it is determined whether additional data is available to be transmitted. According to one embodiment, after a 1 KB payload has been transmitted, the decision to keep the existing connection open will depend on the number of frames pending for the existing connection.

If no more data is available for transmission timer 222 is stopped, at processing block 540. At processing block 550, the connection is closed. If additional data is to be transmitted at processing block 530, the data is transmitted, at processing block 560. At processing block 570, it is determined whether it is determined whether timer 222 has expired. If timer 222 has not expired, control is returned to processing block 530 where it is determined whether additional data is available to be transmitted.

If timer 222 has expired, it is determined whether there are competing requests received from other initiator devices to transfer data to the same target, at decision block 580. If there are no competing connection requests, control is returned to processing block 520 where timer 222 is reset. However, if there are competing connection requests, the connection is closed, processing block 550.

Thus, the above-described variable TDMA connection management scheme provides a consistent connection management scheme for link layer communication with both targets directly attached to a host device and targets attached to a host device via an expander, and an arbitration scheme that optimizes the connection open-close as per the system state.

Whereas many alterations and modifications will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims.

What is claimed is:

1. An apparatus comprising:
a connection manager to determine, based upon a first computed probability of a first blocked pathway, when to allocate to a first initiator a connection with a target device, the first computed probability being computed after discovery of the target device by a host device, the first computed probability being determined by the connection manager and being directly proportional to a number of links in the pathway, the computed probability involving a potential connection collision with a second initiator requesting to connect to the target device, the connection manager to allocate the connection to the first initiator when the first computed probability of the first blocked pathway is higher than a second computed probability of a second blocked pathway between the second initiator and the target device.

2. The apparatus of claim 1 wherein the connection manager maintains an open connection to the target device if additional data is to be transmitted to the target device and there is no competing request to access the target device.

3. The apparatus of claim 2 wherein the connection manager closes the connection with the target device upon detecting that there is a competing request to access the target device and the competing request has a higher probability of a blocked pathway than the connection being serviced.

4. The apparatus of claim 2 wherein the connection manager maintains the open connection to the target device if there is a competing request to access the target device and the competing request has a lower probability of a blocked pathway connection being serviced.

5. The apparatus of claim 2 wherein the connection manager comprises a timer to track the time the connection is open with the target device.

6. The apparatus of claim 5 wherein the connection with the target device is closed if there is no competing request to access the target device and the timer has expired.

7. A method comprising:
determining, based upon a first computed probability of a first blocked pathway, when to establish a connection between a host device and a target device via a connection manager at the host device based upon a probability of a blocked pathway value received at the connection manager, the first computed probability being computed after discovery of the target device by the host device;
transferring data between the host device and the target device; and
determining if additional data is to be transferred between the host device and the target device;
determining if a competing request to access the target device has been received if additional data is to be transferred between the host device and the target device; and
maintaining an open connection between the host device and the target device if no competing request to access the target device has been received;
the first computed probability being determined by the connection manager and being proportional to a number of links in the pathway, the first computed probability involving a potential connection collision with another initiator requesting to connect to the target device, the connection manager to allocate the connection to the host device when the first computed probability of the first blocked pathway is higher than a second computed probability of a second blocked pathway between the another initiator and the target device.

8. The method of claim 7 further comprising:
determining whether the competing request has a higher probability of a blocked pathway than the connection between the host device and the target device if a competing request to access the target device has been received; and
terminating the connection between the host device and the target device if the competing request has the higher probability of a blocked pathway.

9. The method of claim 8 further comprising maintaining the open connection between the host device and the target device if the received competing request has a lower probability of a blocked pathway.

10. The method of claim 9 further comprising:
determining whether a timer has expired if the received competing request has the lower probability of a blocked pathway; and
terminating the connection between the host device and the target device if the competing request has the lower probability of a blocked pathway and the timer has expired.

11. The method of claim 7 further comprising terminating the connection if no additional data is to be transferred between the host device and the target device.

12. A system comprising:
a hard disk drive; and
a host device, coupled to the hard disk drive, having a connection manager to determine, based upon a first computed probability of a first blocked pathway, when to allocate a connection with the hard disk drive, the first computed probability being computed after discovery of a target device by a host device, the first computed probability being determined by the connection manager and being proportional to a number of links in the first pathway, the first computed probability involving a potential connection collision with another initiator requesting to connect to the target device, the connection manager to allocate the connection to the host device when the first computed probability is higher than a second computed probability of a second blocked pathway between the another initiator and the target device.

13. The system of claim 12 wherein the connection manager maintains an open connection to the hard disk drive if additional data is to be transmitted to the hard disk drive and there is no competing request to access the hard disk drive.

14. The system of claim 13 wherein the connection manager closes the connection with the hard disk drive upon detecting that there is a competing request to access the hard disk drive and the competing request has a higher probability of a blocked pathway than the connection being serviced.

15. The system of claim 14 wherein the connection manager maintains the open connection to the hard disk drive if there is a competing request to access the hard disk drive and the competing request has a lower probability of a blocked pathway connection being serviced.

16. The system of claim 13 wherein the connection manager comprises a timer to track the time the connection is open with the hard disk drive.

17. A method comprising:
determining, based upon a first computed probability of a first blocked pathway, when to establish a connection between a first host device and a target device via a connection manager at the first host device, the first computed probability being computed after discovery of the target device by the first host device;
transferring input/output (I/O) data between the first host device and the target device;
determining if additional I/O data is to be transferred between the first host device and the target device;
determining if a timer has expired;
determining if a competing request to access the target device has been received if the timer has expired; and
maintaining an open connection between the first host device and the target device to transfer the additional data if no competing request to access the target device has been received, the first computed probability being determined by the connection manager and being proportional to a number of links in the pathway, the first computed probability involving a potential connection collision with a second host device requesting to connect to the target device, the connection manager to allocate the connection to the first host device when the first computed probability is higher than a second computed probability of a second blocked pathway between the second host device and the target device.

18. The method of claim 17 further comprising resetting the timer if no competing request to access the target device has been received.

19. The method of claim 17 further comprising terminating the connection between the first host device and the target device if the timer has expired and a competing request has been received.

20. The method of claim 17 further comprising maintaining the connection between the first host device and the target device if the timer has not expired and a competing request has been received.

21. The method of claim 17 further comprising terminating the connection between the first host device and the target device if no additional I/O data is to be transferred between the first host device and the target device.

22. An article of manufacture including a tangible computer readable medium that stores a program of instructions, wherein the program of instructions, when executed by a processing unit, causes the processing unit to perform the process of:
determining, based upon a first computed probability of a first blocked pathway, when to establish a connection between a host device and a target device via a connection manager at the host device, the first computed probability being computed after discovery of the target device by the host device;
transferring input/output (I/O) data between the host device and the target device;
determining if additional I/O data is to be transferred between the host device and the target device;
determining if a competing request to access the target device has been received if additional I/O data is to be transferred between the host device and the target device; and
maintaining an open connection between the host device and the target device if no competing request to access the target device has been received;
the first computed probability being determined by the connection manager and being proportional to a number of links in the pathway, the first computed probability involving a potential connection collision with another initiator requesting to connect to the target device, the connection manager to allocate the connection to the host device when the first computed probability is higher than a second computed probability of a second blocked pathway between the another initiator and the target device.

23. The article of manufacture of claim 22 wherein the program of instructions, when executed by the processing unit, further causes the processing unit to perform the process of:
determining whether the competing request has a higher probability of a blocked pathway than the connection between the host device and the target device if the competing request to access the target device has been received; and
terminating the connection between the host device and the target device if the competing request has the higher probability of a blocked pathway.

24. The article of manufacture of claim 23 wherein the program of instructions, when executed by the processing unit, further causes the processing unit to perform the process of maintaining the open connection between the host device and the target device if the received competing request has a lower probability of a blocked pathway.

25. The article of manufacture of claim 24 wherein the program of instructions, when executed by a processing unit, further causes the processing unit to perform the process of:

determining whether a timer has expired if the received competing request has a lower probability of a blocked pathway; and terminating the connection between the host device and the target device if the competing request has the lower probability of a blocked pathway and the timer has expired.

26. The article of manufacture of claim 22 wherein the program of instructions, when executed by the processing unit, further causes the processing unit to perform the process of terminating the connection if no additional I/O data is to be transferred between the host device and the target device.

* * * * *